United States Patent
Ohira et al.

(10) Patent No.: US 12,168,260 B2
(45) Date of Patent: Dec. 17, 2024

(54) METHOD, METHOD OF MANUFACTURING LIQUID DISCHARGE HEAD, AND LIQUID DISCHARGE HEAD

(71) Applicant: CANON KABUSHIKI KAISHA, Tokyo (JP)

(72) Inventors: Masatoshi Ohira, Kanagawa (JP); Masato Takikawa, Kanagawa (JP); Kenji Fujii, Kanagawa (JP); Naoki Nakajo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 17/528,879

(22) Filed: Nov. 17, 2021

(65) Prior Publication Data
US 2022/0169025 A1    Jun. 2, 2022

(30) Foreign Application Priority Data
Nov. 27, 2020 (JP) ................. 2020-197405

(51) Int. Cl.
B23K 20/00 (2006.01)
B23K 20/10 (2006.01)

(52) U.S. Cl.
CPC ................... *B23K 20/10* (2013.01)

(58) Field of Classification Search
CPC .................................................. B23K 20/10
See application file for complete search history.

(56) References Cited

U.S. PATENT DOCUMENTS

| | | | | |
|---|---|---|---|---|
| 5,853,577 A * | 12/1998 | Gizowski | ............ | B29C 66/1312 210/416.5 |
| 6,066,216 A * | 5/2000 | Ruppel, Jr. | ....... | B29C 66/73921 156/580.2 |
| 2013/0112735 A1* | 5/2013 | Luechinger | ......... | H01L 31/0504 228/110.1 |
| 2014/0255718 A1* | 9/2014 | Slattery | ................. | B32B 15/017 428/603 |
| 2014/0292937 A1* | 10/2014 | Chida | .................... | B41J 2/1643 29/850 |
| 2015/0129542 A1* | 5/2015 | Ohsumi | ................. | B41J 2/1634 216/27 |
| 2016/0007485 A1* | 1/2016 | Hartmann | .............. | H05K 1/181 361/752 |

(Continued)

FOREIGN PATENT DOCUMENTS

| CN | 2728699 Y | 9/2005 |
|---|---|---|
| CN | 102785475 A | 11/2012 |

(Continued)

*Primary Examiner* — Erin B Saad
(74) *Attorney, Agent, or Firm* — Canon U.S.A., Inc. IP Division

(57) ABSTRACT

A method of welding a first member and a second member together includes preparing the first member and the second member, bringing the first member and the second member into contact to form a space between the first member and the second member, and bringing a welding horn into contact with the first member or the second member. The method of welding further includes performing a vibration process to vibrate the welding horn to weld the first member and the second member together by frictional heat, and performing a fluid-flow process to make fluid flow through the space. The fluid-flow process is performed during the vibration process.

24 Claims, 15 Drawing Sheets

(56) References Cited

U.S. PATENT DOCUMENTS

| | | | |
|---|---|---|---|
| 2017/0028730 A1* | 2/2017 | Yaginuma | B41J 2/1623 |
| 2019/0270255 A1* | 9/2019 | Larsen | B29C 65/08 |
| 2020/0161217 A1* | 5/2020 | Joshi | H01L 23/49838 |
| 2021/0088226 A1* | 3/2021 | Wiegel | B32B 27/308 |
| 2022/0169025 A1* | 6/2022 | Ohira | B23K 20/10 |
| 2023/0067812 A1* | 3/2023 | Wiegel | F28D 1/03 |

FOREIGN PATENT DOCUMENTS

| | | |
|---|---|---|
| CN | 103930344 A | 7/2014 |
| CN | 108025388 A | 5/2018 |
| CN | 210848778 U | 6/2020 |
| JP | H01171839 A | 7/1989 |
| JP | H0752255 A | 2/1995 |
| JP | 2001026056 A | 1/2001 |
| JP | 2014188673 A | 10/2014 |
| JP | 2014233960 A | 12/2014 |
| JP | 2016018993 A | 2/2016 |
| JP | 2018047599 A | 3/2018 |
| JP | 6770612 B1 | 10/2020 |
| KR | 20160024790 A | 3/2016 |

\* cited by examiner

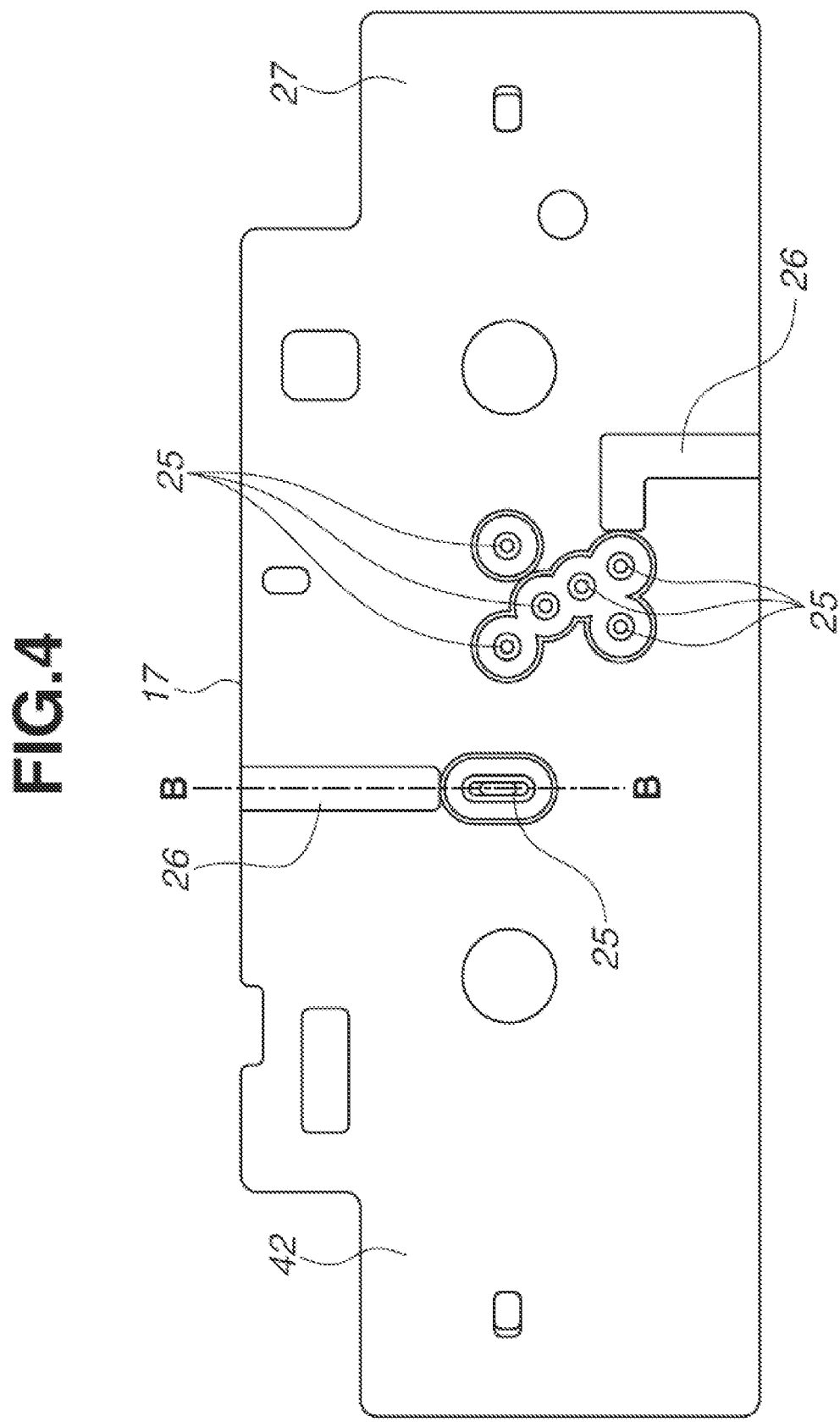

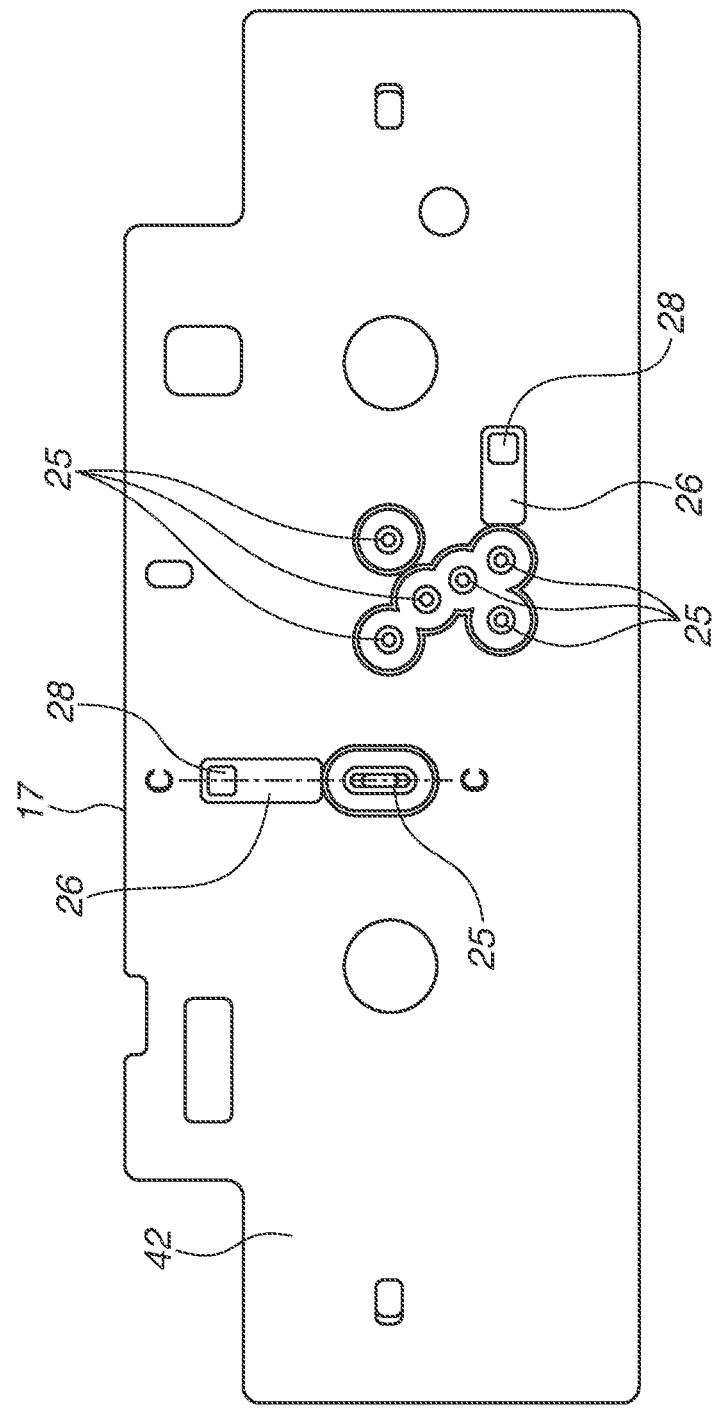

METHOD, METHOD OF MANUFACTURING LIQUID DISCHARGE HEAD, AND LIQUID DISCHARGE HEAD

BACKGROUND

Field

The present disclosure relates to a method, a method of manufacturing a liquid discharge head, and a liquid discharge head.

Description of the Related Art

Examples of methods of joining members together to manufacture a structure include laser welding and ultrasonic welding. In some cases, it is difficult to adopt the laser welding for mass-produced products because the welding time is relatively long.

Japanese Patent Application Laid-Open No. 7-52255 discusses a joint method regarding ultrasonic welding. Methods of welding members together by frictional heat, such as ultrasonic welding, are suitable as means for joining members together at low cost and in a short time. However, in the ultrasonic welding, vibrations during the welding cause members to rub one another, and part of the members may peel off. If the structure has a space therein, chips which have been peeled off from the members may remain in the space, as a plurality of minute chips (dust). If the minute chips remain in the space, the performance of the structure may decrease.

SUMMARY

To remove the minute chips, a method of cleaning an inside of the space by making a fluid, such as water, flow through the space after completion of the welding is conceivable. However, the chips generated by friction are charged with static electricity, and can stick to an inner wall surface of the space. If the chips stick to the inner wall surface, it is difficult to remove the chips by cleaning after completion of the welding, and thus it may take a long time for cleaning.

The present disclosure is directed to providing a method of welding members together using frictional heat while enabling the removal of chips in the space in a short time.

According to an aspect of the present disclosure, a method of welding a first member and a second member together includes performing a preparation process of preparing the first member and the second member, performing a contact process of bringing the first member and the second member into contact so as to form a space between the first member and the second member, performing a welding-horn contact process of bringing a welding horn into contact with the first member or the second member, performing a vibration process of vibrating the welding horn to weld the first member and the second member together by frictional heat, and performing a fluid-flow process of making a fluid flow through the space, wherein the fluid-flow process is performed during the vibration process.

Further features of the present disclosure will become apparent from the following description of exemplary embodiments with reference to the attached drawings.

BRIEF DESCRIPTION OF THE DRAWINGS

FIG. 4 is a top view illustrating a plane of the channel-forming member on the opposite side of the welding plane of the channel-forming member.

FIG. 13 is a top view illustrating a channel-forming member according to a second exemplary embodiment.

DESCRIPTION OF THE EMBODIMENTS

Hereinafter, exemplary embodiments of the present disclosure will be described in detail. The following description will be provided using a liquid discharge head that discharges liquid as an example of a structure having a space therein.

(Liquid Discharge Head)

Figure 1A:
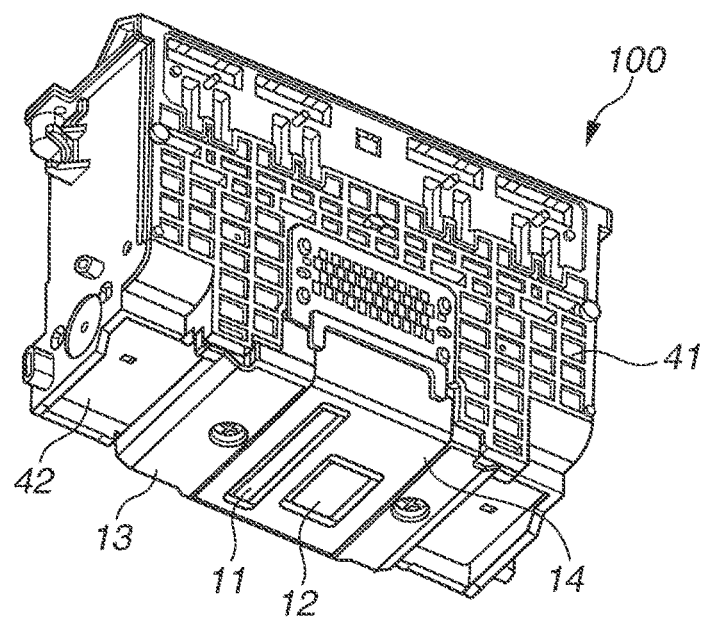
FIG. 1A is a perspective view illustrating a liquid discharge head and FIG. 1B is an exploded perspective view illustrating disassembled members of the liquid discharge head illustrated in FIG. 1A.
Figure 1B:
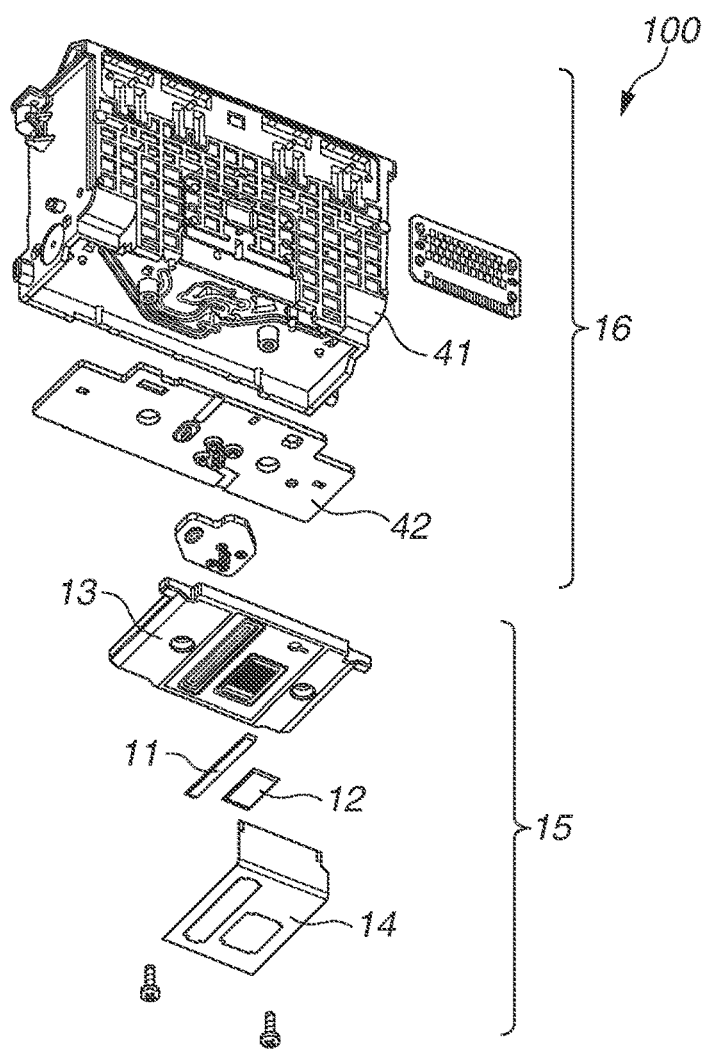
Figure 3A:
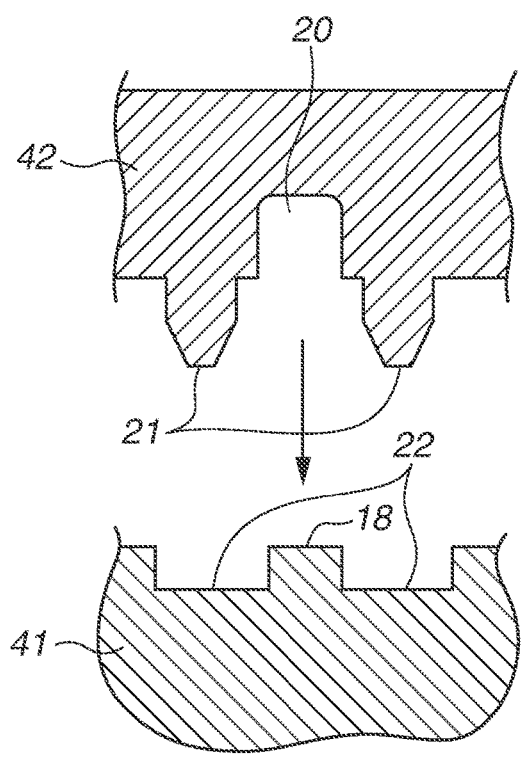
FIGS. 3A and 3B are cross-sectional views taken along line A-A illustrated in FIGS. 2A and 2B.
Figure 3B:
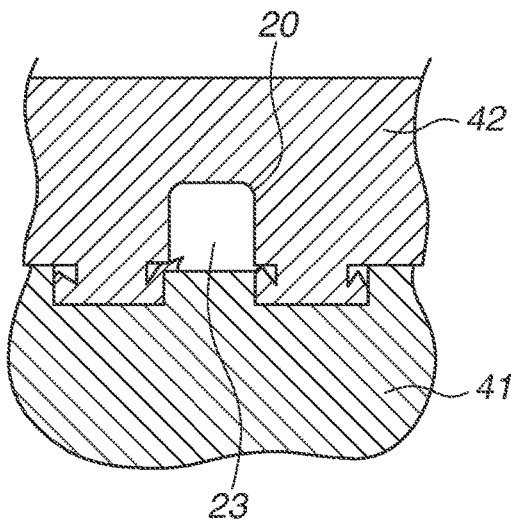

A first exemplary embodiment of the present disclosure will be described below. FIG. 1A is a perspective view illustrating a liquid discharge head 100 according to the present exemplary embodiment. FIG. 1B is an exploded perspective view illustrating disassembled members of the liquid discharge head 100 illustrated in FIG. 1A. As illustrated in FIG. 1B, the liquid discharge head 100 according to the present exemplary embodiment mainly includes a printing element unit 15 and a housing unit 16. The printing element unit 15 mainly includes printing element substrates 11 and 12 having discharge nozzles that discharge liquid, an electric wiring substrate 14 for supplying electric energy to the printing element substrates 11 and 12, and a supporting plate 13 that supports the printing element substrates 11 and 12. The housing unit 16 mainly includes a housing 41 (second member) to which liquid containers (not illustrated) containing liquid to be supplied to the discharge nozzles are to be connected, and a channel-forming member 42 (first member) that has a second recess portion 20 (FIGS. 3A and 3B). The second recess portion 20 is to serve as channels 23 (FIGS. 3A and 3B) for supplying liquid from the liquid containers to the discharge nozzles.

Figure 2A:
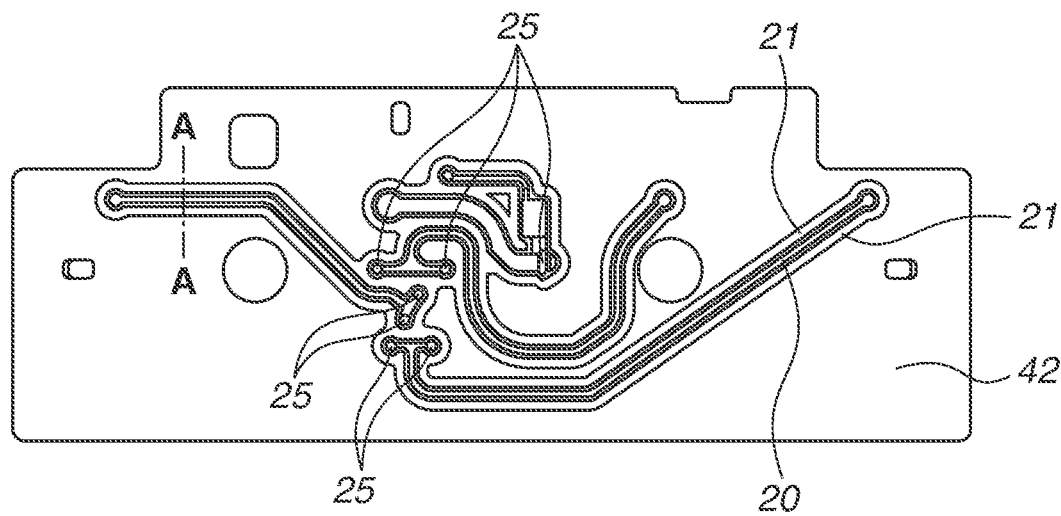
FIGS. 2A and 2B are schematic views illustrating a welding plane of a channel-forming member and a welding plane of a housing, respectively.
Figure 2B:
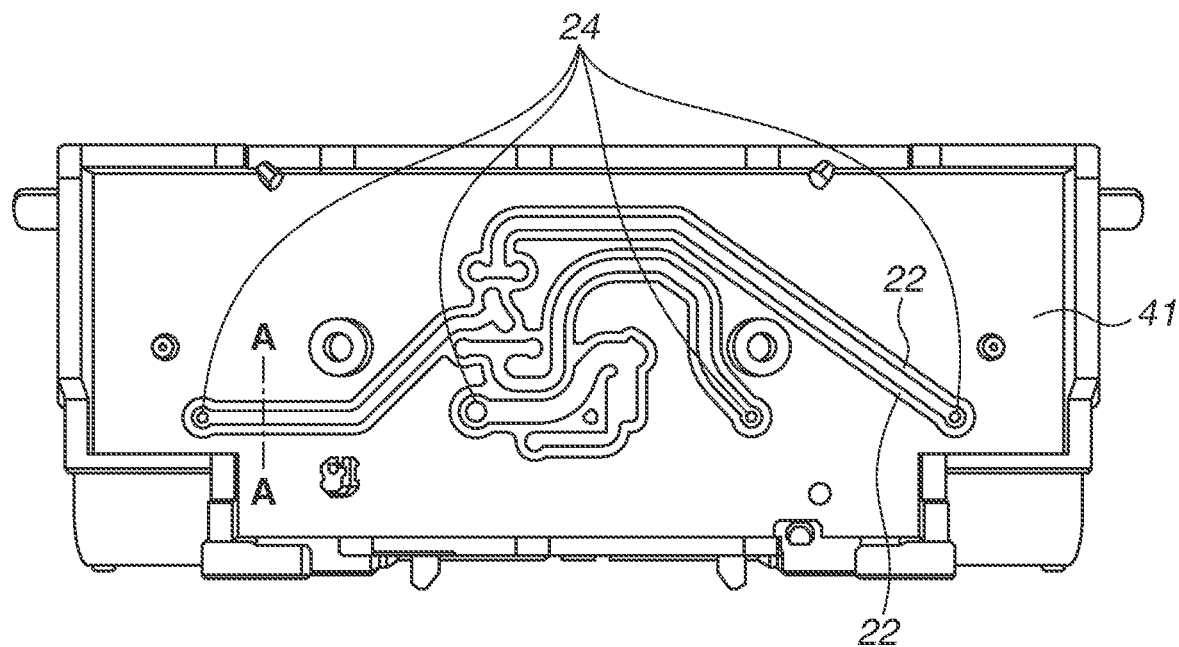

FIGS. 2A and 2B are schematic views illustrating a welding plane of the channel-forming member 42 and a welding plane of the housing 41, respectively. FIG. 2A is a top view illustrating the welding plane of the channel-forming member 42 to be welded to the housing 41 (a plane facing the housing 41). FIG. 2B is a top view illustrating the welding plane of the housing 41 to be welded to the channel-forming member 42 (a plane facing the channel-forming member 42). FIGS. 3A and 3B are cross-sectional views taken along line A-A of FIGS. 2A and 2B. FIG. 3A is a cross-sectional view illustrating a state of the housing 41 and the channel-forming member 42 before the welding. FIG. 3B is a cross-sectional view illustrating a state of the housing 41 and the channel-forming member 42 after the welding. As illustrated in FIG. 3B, the second recess portion 20 of the channel-forming member 42 and a fitting portion 18 of the housing (fitting member) 41 are fitted into each other to form the channels 23.

The housing 41 has a first recess portion 22, and second through holes 24 which establishes communication for the region from the welding plane to the plane on the opposite side of the welding plane. The second through holes 24 are holes from which liquid from the liquid containers flows into the channels 23 of the channel-forming member 42. The channel-forming member 42 has the second recess portion 20, which is to serve as the channels 23, protruding portions (welding ribs) 21, and first through holes 25 which establishes communication for the region from the welding plane to the plane on the opposite side of the welding plane. The first through holes 25 are holes leading to the printing element unit 15. The liquid that has flowed through the channels 23 from the second through holes 24 is supplied to the printing element unit 15 through the first through holes 25.

Ultrasonic welding to be described in detail below is performed in a state in which the protruding portions 21 and the first recess portion 22 are in contact with each other. Thus, part of the protruding portions 21 melts and is joined to the housing 41, thus joining the housing 41 and the channel-forming member 42. Thus, a periphery of the second recess portion 20 is sealed to form the channels 23 through which liquid flows. The number of the channels 23 formed corresponds to the number of inks of the liquid discharge head 100. Due to the formation of the channels 23, the second through holes 24 of the housing 41 and the first through holes 25 of the channel-forming member 42 communicate with each other, and liquid supplied from the liquid containers can flow to the printing element unit 15.

FIG. 4 is a top view illustrating a plane plane 27 (a member surface 27) of the channel-forming member 42 on the opposite side of the welding plane of the channel-forming member 42 illustrated in FIG. 2A (a plane on a printing element unit 15 side). As illustrated in FIG. 4, the channel-forming member 42 according to the present exemplary embodiment has a groove portions 26. The groove portions 26 each extend from the vicinity of the corresponding first through holes 25 to an outer edge 17 of the channel-forming member 42. The groove portions 26 each function as a path through which air passes in an air flow process performed at a time of ultrasonic welding (described below). Here, the vicinity of the first through holes 25 refers to an area within 30 mm or less from the first through holes 25 and within a range of a position that overlaps third recess portions 51 (FIG. 5) of a welding horn surface 52 of a welding horn 50 described below when the welding horn 50 is brought into contact with the channel-forming member 42.

Figure 5:
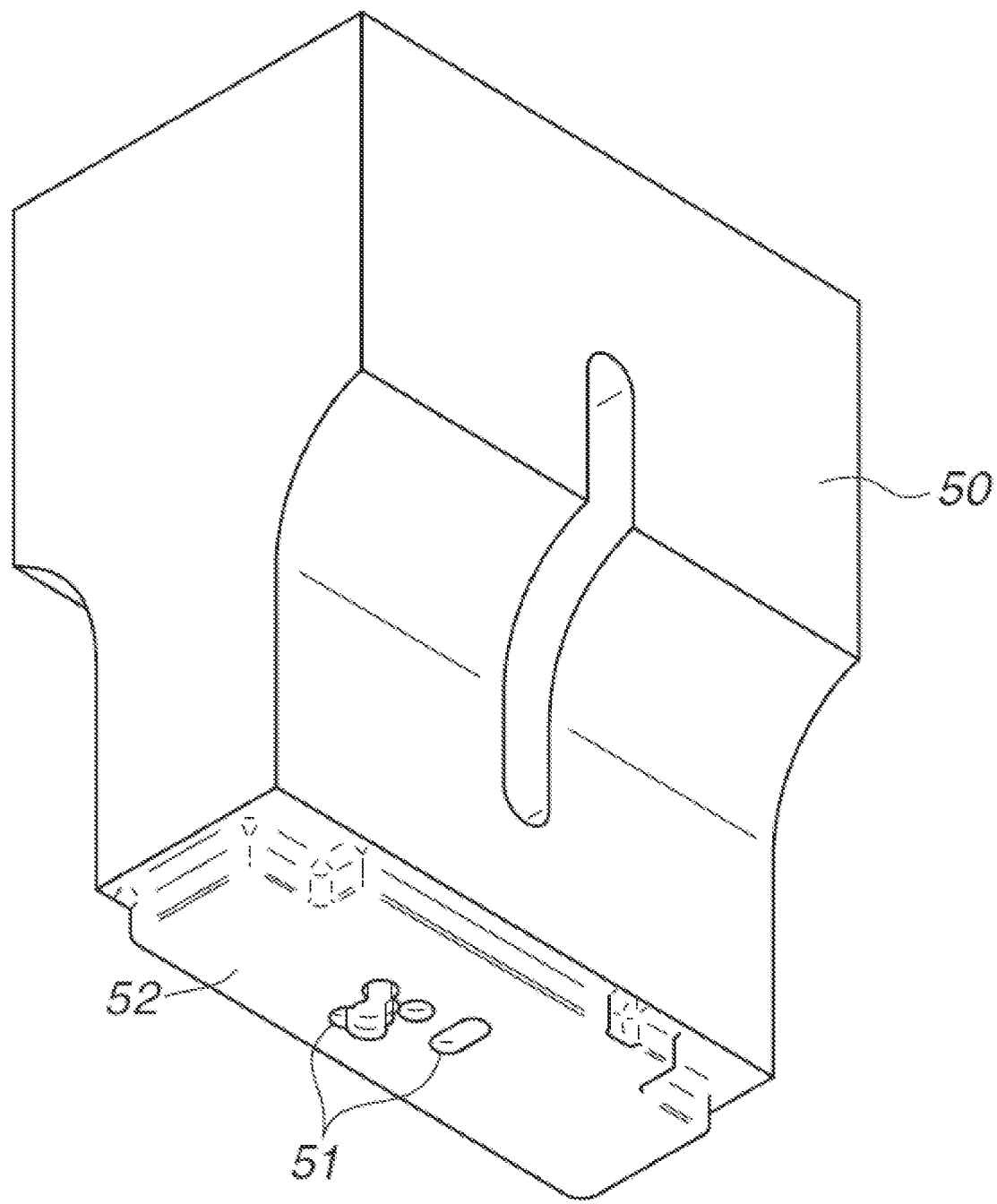
FIG. 5 is a perspective view illustrating a welding horn.
Figure 6:
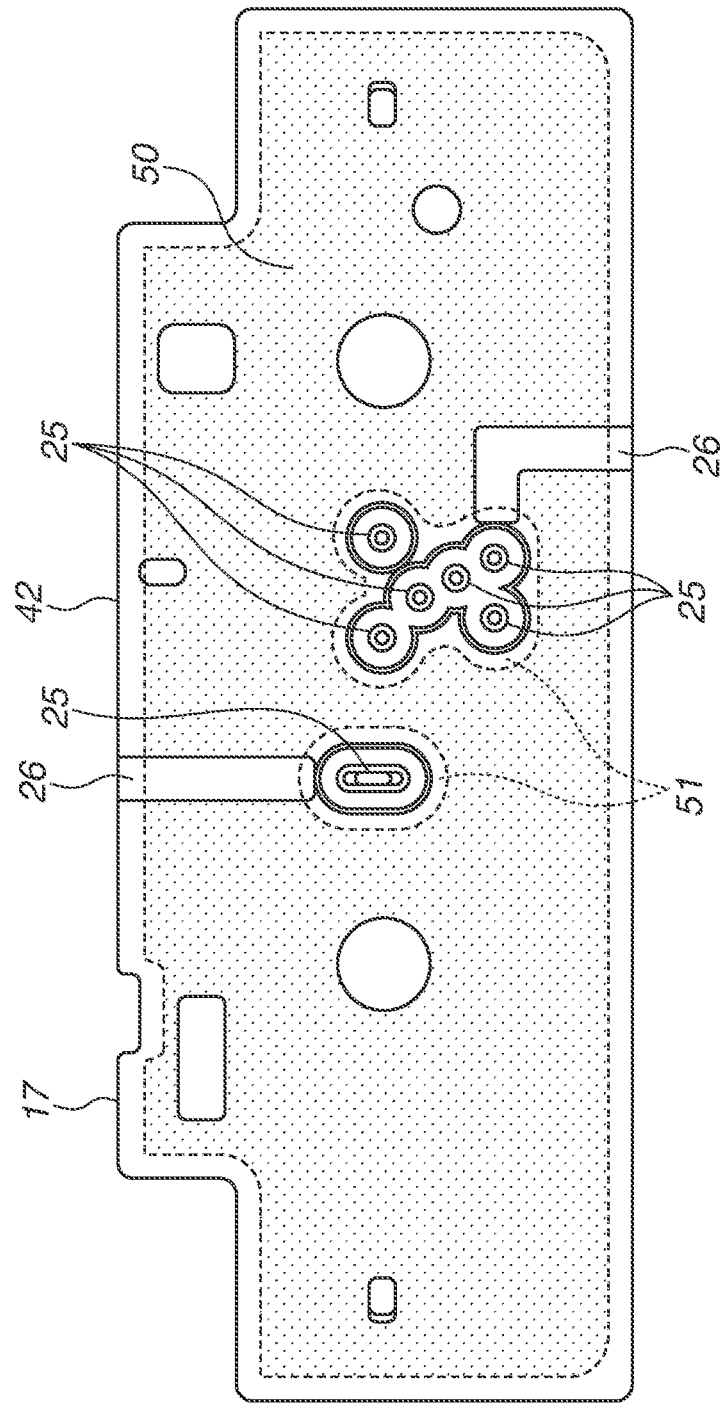
FIG. 6 is a schematic view illustrating an area where the welding horn and the channel-forming member are to be in contact with each other.

FIG. 5 is a perspective view illustrating the welding horn 50 that is used at a time of ultrasonic welding between the housing 41 and the channel-forming member 42. FIG. 6 is a schematic view illustrating an area where the welding horn 50 and the channel-forming member 42 are in contact with each other when the welding horn 50 is brought into contact with the channel-forming member 42. In FIG. 6, the area where the welding horn 50 and the channel-forming member 42 are to be in contact is indicated by a dotted area. The welding horn 50 has the third recess portions 51 at a portion at which the welding horn 50 is to be in contact with the channel-forming member 42. The first through holes 25 of the channel-forming member 42 protrude from the surrounding plane. Thus, the third recess portions 51 are formed on the welding horn 50 in order to prevent a direct contact of the first through holes 25 and the welding horn 50. This configuration brings the welding horn 50 into contact with the channel-forming member 42 except the first through holes 25 and its vicinity as well as near the outer edge 17 of the channel-forming member 42, as illustrated in FIG. 6. The contact of the first through holes 25 and the welding horn 50 is avoided in order to secure a path for air flow described below. As illustrated in FIG. 6, in the top view, there is a portion where the third recess portions 51 of the welding horn 50 overlap part of the groove portions 26 of the channel-forming member 42, so that a path through which air passes during ultrasonic welding is secured. In other words, the air that has passed through the first through holes 25 is discharged to the outside through the third recess portions 51 and the groove portions 26.

The groove portions 26 are provided at any place of the channel-forming member 42 as long as the insides of the channels 23 (FIG. 3B) communicate with the outer edge 17 (end portion) of the channel-forming member 42 through the first through holes 25 when the welding horn 50 is brought into contact with the channel-forming member 42. Thus, the air that has flowed through the channels 23 is discharged to the outside in the air flow process described below. However, it is not desirable that the groove portions 26 be formed at a position directly over the welding ribs 21, if possible. This is because it is desirable that the welding horn surface 52 of the welding horn 50 be brought into contact with the member surface 27 of the channel-forming member 42 at a position directly over the welding ribs 21 to transfer vibration energy of the welding horn 50 to the protruding portions (welding ribs) 21 without losing the vibration energy as much as possible. It is desirable that the size of the respective groove portions 26 be sufficiently larger than the width and depth of the channels 23 so as not to hinder flow rate setting for the air flow from the viewpoint of pressure loss.

(Method of Manufacturing Liquid Discharge Head)

Next, a method of manufacturing the liquid discharge head 100 according to the present exemplary embodiment will be described with reference to FIGS. 7 to 11. The method of manufacturing the liquid discharge head 100 according to the present exemplary embodiment is characterized in that air flow is supplied into the channels 23 during ultrasonic welding for the housing 41 and the channel-forming member 42. In the following description of the manufacturing method, only characteristic portions of the present exemplary embodiment will be described in detail, and descriptions of other processes will be omitted.

Figure 7:
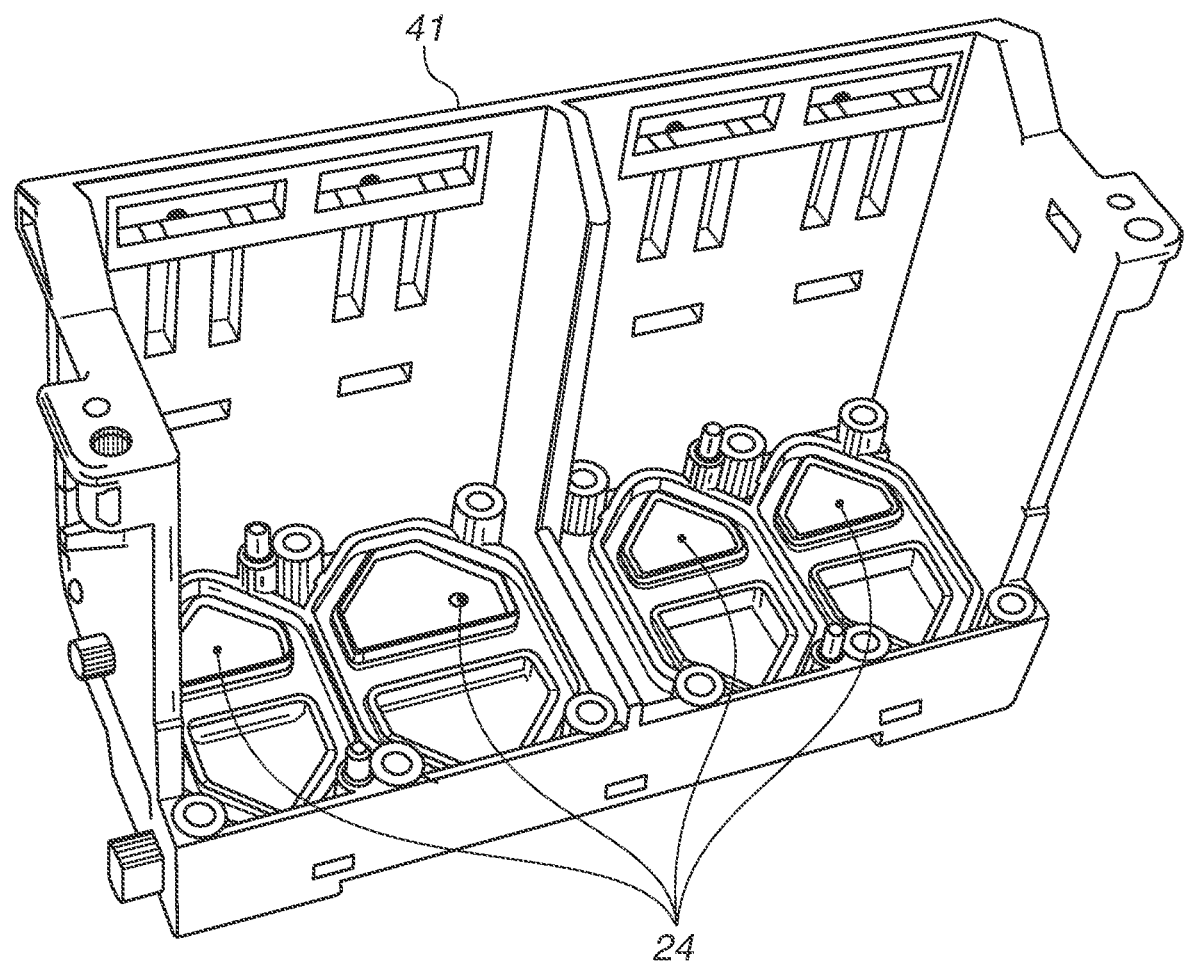
FIG. 7 is a perspective view illustrating a side of the housing to which liquid containers are to be connected.
Figure 8B:
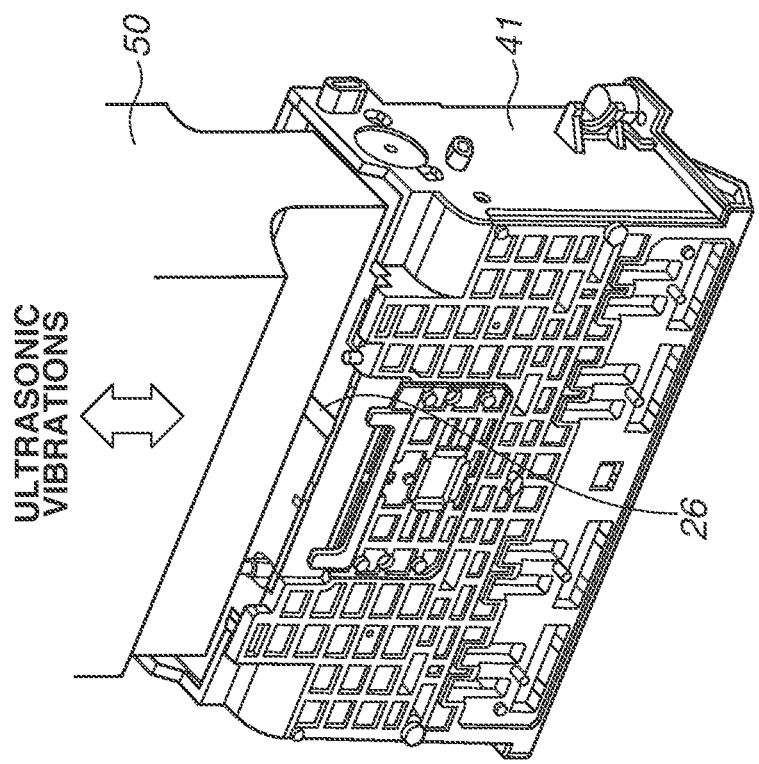
FIGS. 8A and 8B are perspective views illustrating a vibration process based on ultrasonic welding.
Figure 8A:
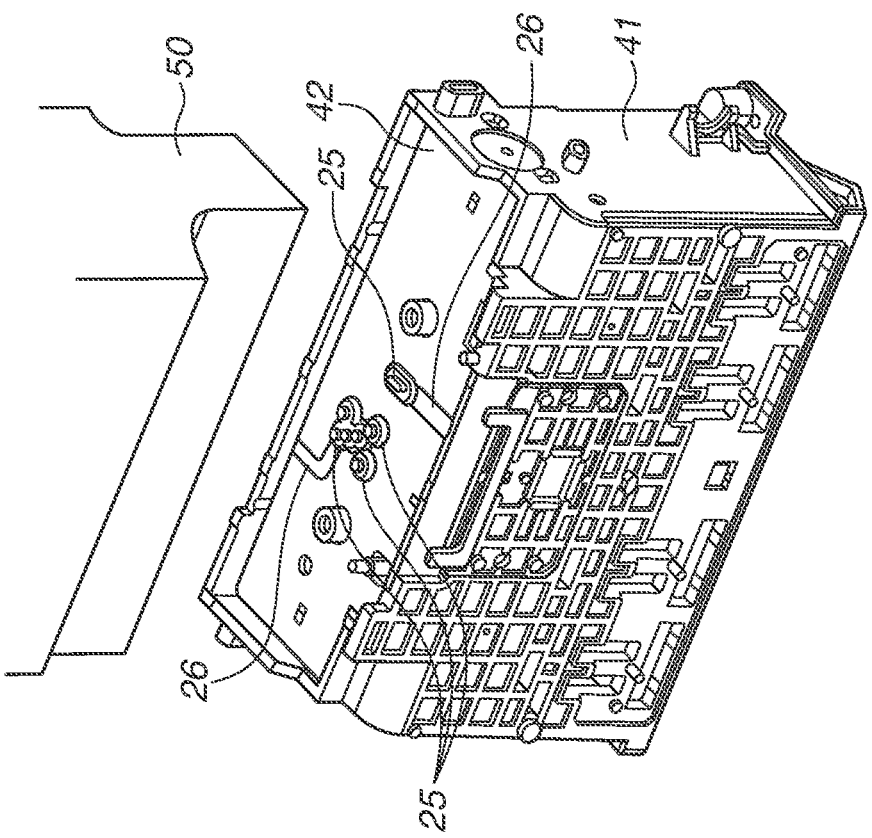
Figure 9:
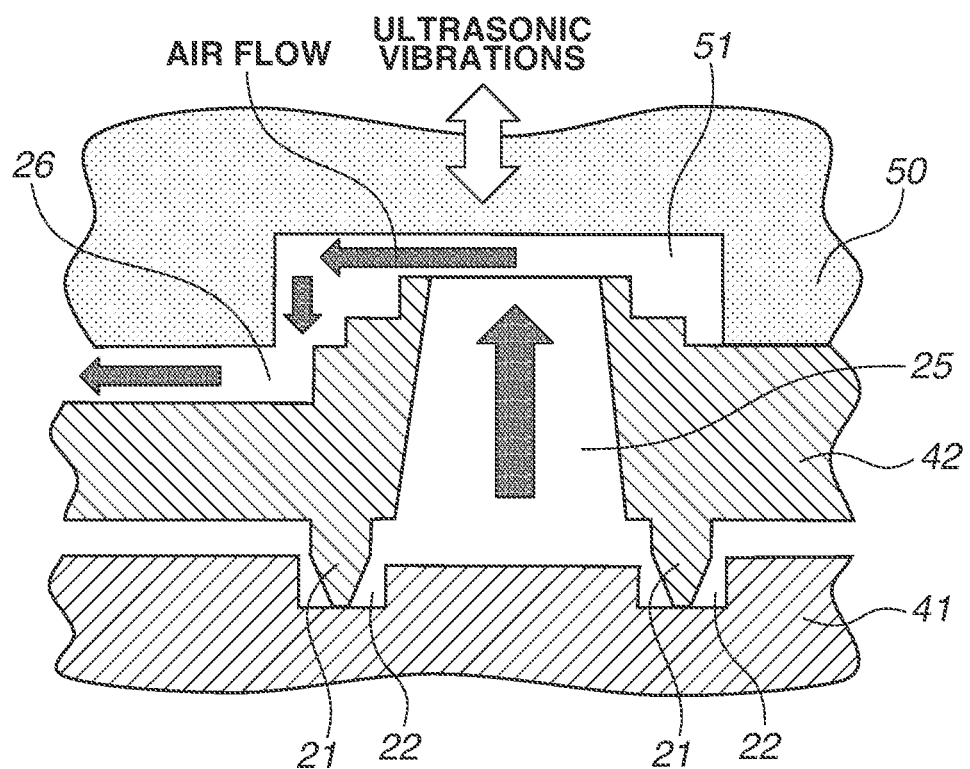
FIG. 9 is a schematic view illustrating a flow of air during ultrasonic welding.
Figure 10:
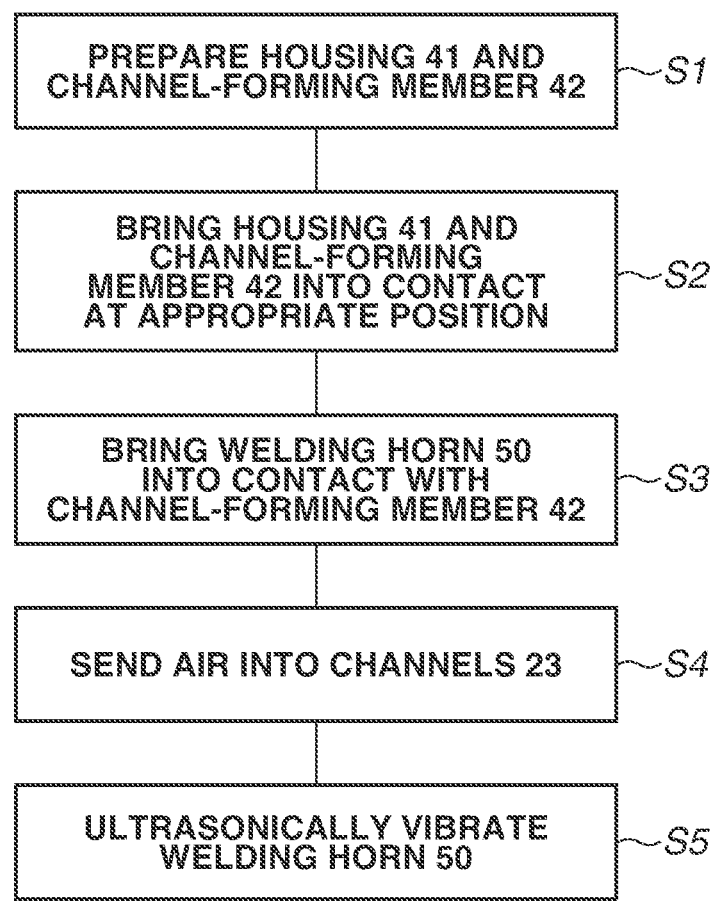
FIG. 10 is a flowchart illustrating each process of a method of manufacturing the liquid discharge head.
Figure 11:
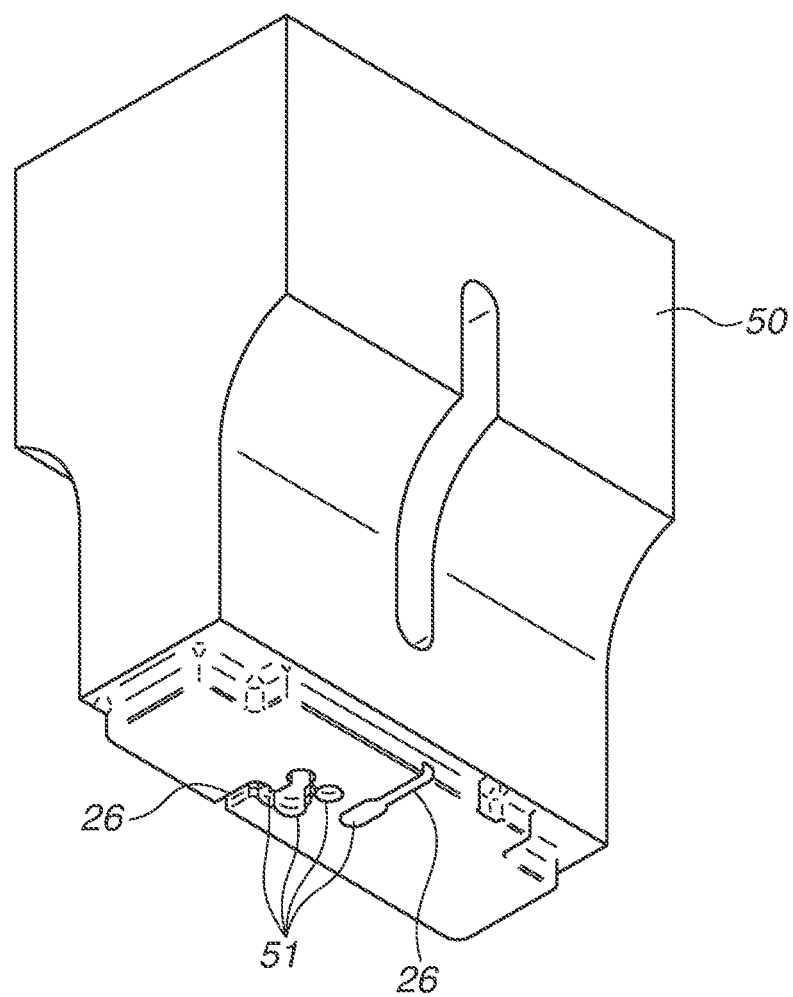
FIG. 11 is a schematic view illustrating a variation of the welding horn.

FIG. 7 is a perspective view illustrating a side of the housing 41 to which the liquid containers are to be connected. FIG. 8A is a perspective view illustrating a state where the housing 41 and the channel-forming member 42 are fitted into each other at an appropriate position. FIG. 8B is a perspective view illustrating a state in which the welding horn 50 is in contact with the channel-forming member 42 by the welding horn 50 in the state illustrated in FIG. 8A being brought into contact with the channel-forming member 42. FIG. 9 is a schematic view illustrating a flow of air during ultrasonic welding, and is a schematic view taken along line B-B illustrated in FIG. 4. FIG. 10 is a flowchart illustrating each process of the method of manufacturing the liquid discharge head 100 according to the present exemplary embodiment. FIG. 11 is a schematic view illustrating a variation of the welding horn 50 illustrated in FIG. 5.

Initially, in step S1 in FIG. 10, the housing 41 and the channel-forming member 42 are prepared (preparation process). Next in step S2 in FIG. 10, as illustrated in FIG. 8A, the housing 41 and the channel-forming member 42 are brought into contact at an appropriate position so that the first recess portion 22 of the housing 41 and the protruding portions (welding ribs) 21 of the channel-forming member 42 are fitted into one another to form the channels 23 (contact process). Next in step S3 in FIG. 10, the welding horn surface 52 of the welding horn 50 is brought into contact with the member surface 27 of the channel-forming member 42 (welding-horn contact process). At this time, the welding horn 50 is brought into contact with the channel-forming member 42 so that the third recess portions 51 of the welding horn 50 correspond to the first through holes 25 of the channel-forming member 42. Next in step S4 in FIG. 10, air is sent into the channels 23 (air flow process), and then in step S5 in FIG. 10, while air is being sent, the welding horn 50 is ultrasonically vibrated to weld the housing 41 and the channel-forming member 42 together by frictional heat (vibration process), as illustrated in FIG. 8B. In other words, during the vibration process (during the welding), air is continued to be sent into the channels 23 from the second through holes 24, which is opened to a side of the housing 41 to which the liquid containers are to be connected, as illustrated in FIG. 7. The vibrations of the welding horn 50 melt the protruding portions (welding ribs) 21 of the channel-forming member 42, and the housing 41 and the channel-forming member 42 are joined, as illustrated in FIGS. 3A and 3B. The air flow process may also be referred to as a fluid flow process.

The air supplied into the channels 23 from the second through holes 24 passes through the first through holes 25 of the channel-forming member 42, and then is discharged to the outside through a gap between the channel-forming member 42 and the welding horn 50, as illustrated in FIG. 9. The gap between the channel-forming member 42 and the welding horn 50 is formed by the groove portions 26 of the channel-forming member 42 described above.

When the vibration process is performed to melt the protruding portions (welding ribs) 21, part of the protruding portions (welding ribs) 21 may be peeled and become minute chips, and the minute chips may remain in a space in the channels 23. Thus, the air flow process is performed during the vibration process to remove the minute chips from the insides of the channels 23 before the minute chips stick to inner wall surfaces of the channels 23. The minute chips generated in the channels 23 are carried by the air flow, pass the first through holes 25, the third recess portions 51 of the welding horn 50, and the groove portions 26 of the channel-forming member 42 in this order, and are discharged to the outside. During ultrasonic welding, chips are flying around in the channels 23, and thus, the chips are discharged by air flow more efficiently than in a state where chips stick to the inner wall surfaces after completion of the welding. Further, since the flow of air may be hindered by the occurrence of a welding fin at a joint part after completion of the welding, the chips are discharged more efficiently than in cleaning for removing the chips after completion of the welding. Therefore, according to the present exemplary embodiment, chips generated in the channels 23 are removed in a short time.

When ultrasonic vibration was performed, the present inventors and others observed that chips of the members were generated especially at an initial stage of the welding before a start of melting of the protruding portions (welding ribs) 21. Thus, it is desirable that the air flow be performed before a start of ultrasonic welding. Moreover, from a viewpoint of stabilization of an air flow rate, it is desirable that the supply of air flow be started before a start of ultrasonic welding.

The force that removes the chips depends on a flow rate of air flow. Experiments conducted by the present inventors and others discovered that a sufficient effect is obtained if air of 5 L/min or more flows for each of the channels 23.

In a case where there is a plurality of channels 23 corresponding in number to ink colors, an air flow at a similar flow rate is performed for each of the channels 23. Thus, it is desirable that paths that can independently control the pressure of air for each of the channels 23 be prepared. This is to enable a setting of an appropriate flow rate for each of the channels 23 even if degrees of pressure losses in the channels 23 are different, such as a case where lengths of the channels 23 are different by each ink color.

While in the above description, the groove portions 26 each of which serves as a path through which air passes are formed on the channel-forming member 42, the present exemplary embodiment is not limited to this arrangement. Specifically, the groove portions 26 may be provided on the welding horn 50 as illustrated in FIG. 11. This arrangement is appropriately adopted if it is difficult to provide the groove portions 26 having a sufficient size on the channel-forming member 42. Alternatively, the groove portion 26 may be formed on both the channel-forming member 42 and the welding horn 50. A similar advantageous effect is obtained.

If air flow is performed with ionized air during welding, static electricity of chips can be removed. Thus, the chips can be more efficiently discharged to the outside. While, in the present exemplary embodiment, pressurized air is sent in the air flow process, the air flow process may be performed by air suction by depressurization, as long as a desired flow rate is secured. If warm wind is used for the air flow to preliminarily heat the protruding portions (welding ribs) 21, a time until melting of the welding ribs 21 using ultrasonic welding can be shortened, thus reducing the amount of chips to be generated. While an embodiment in which air is sent into the channels 23 has been exemplified as the air flow process, the present exemplary embodiment is not limited to the embodiment. Specifically, in one embodiment, a liquid, such as water, may be sent into the channels 23. Thus, it is sufficient if a fluid is sent into the channels 23 as for the air flow process. However, performing the air flow process using water or the like at room temperature cools the housing 41 and the channel-forming member 42, which may make it difficult to appropriately perform ultrasonic welding. Thus, it is desirable that a gas, such as air, be used in the air flow process. Although in the above description, the welding horn 50 is brought into contact with the channel-forming member 42, the present exemplary embodiment is not limited thereto. Specifically, ultrasonic welding may be performed by the welding horn 50 being brought into contact with the housing 41 if the housing 41 is appropriately configured.

While an ultrasonic welding method is adopted for joining the housing 41 and the channel-forming member 42 together in the present exemplary embodiment, other welding methods using frictional heat also result in the occurrence of chips of the members, similarly. Thus, the present exemplary embodiment is also suitably applicable to, for example, welding using a vibration welding method.

Figure 12A:
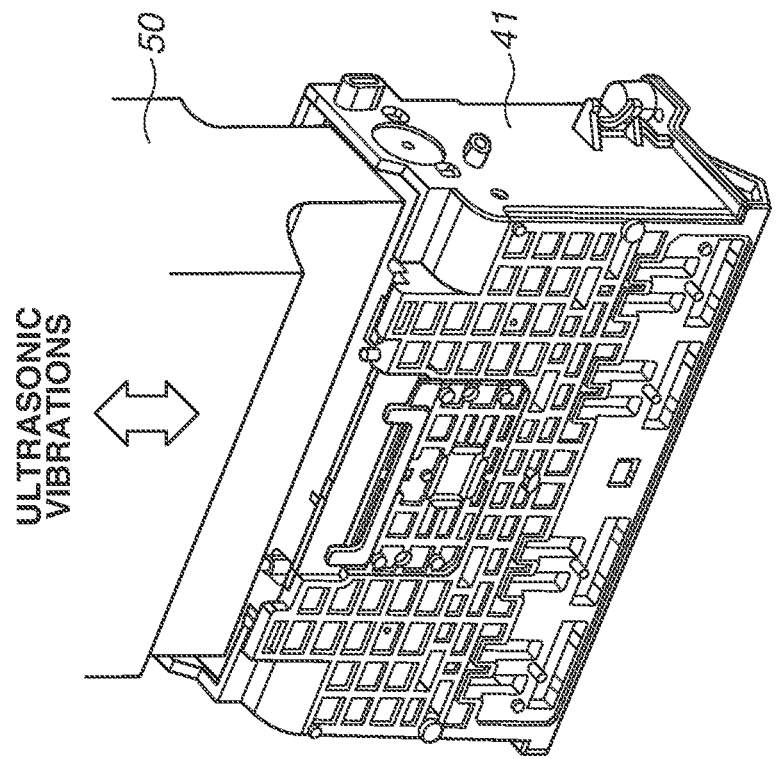
FIGS. 12A and 12B are perspective views illustrating a vibration process based on conventional ultrasonic welding.
Figure 12B:
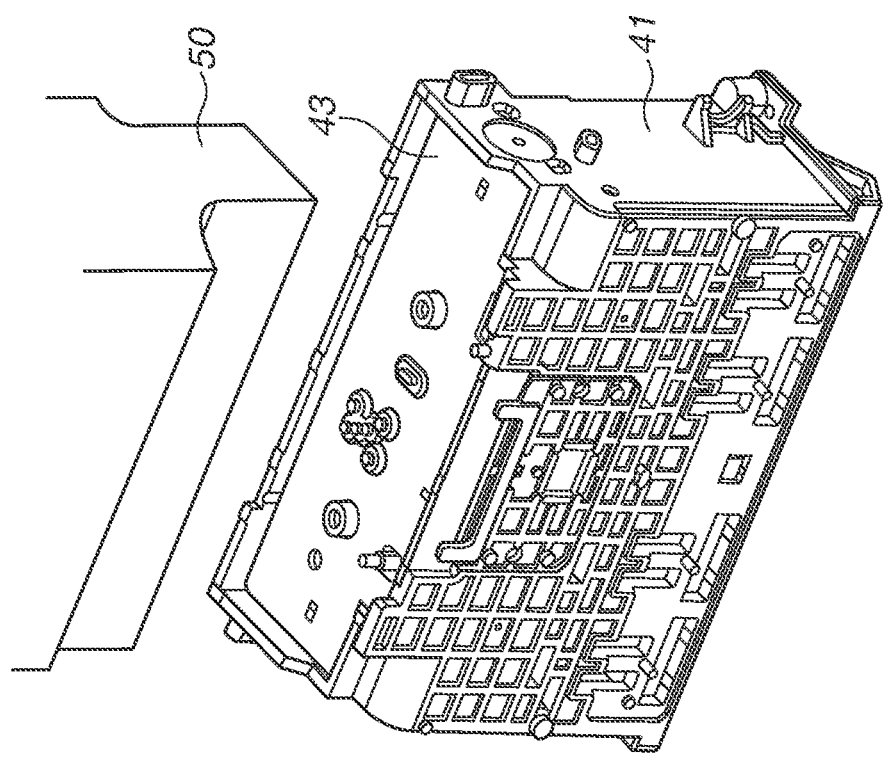

FIGS. 12A and 12B are perspective views illustrating a vibration process based on conventional ultrasonic welding. As illustrated in FIG. 12A, a groove portion 26 is not provided on a conventional channel-forming member 43. Thus, a welding horn 50 blocks an outlet of air as illustrated in FIG. 12B, so that chip removal by air flow during welding cannot be performed.

Figure 14:
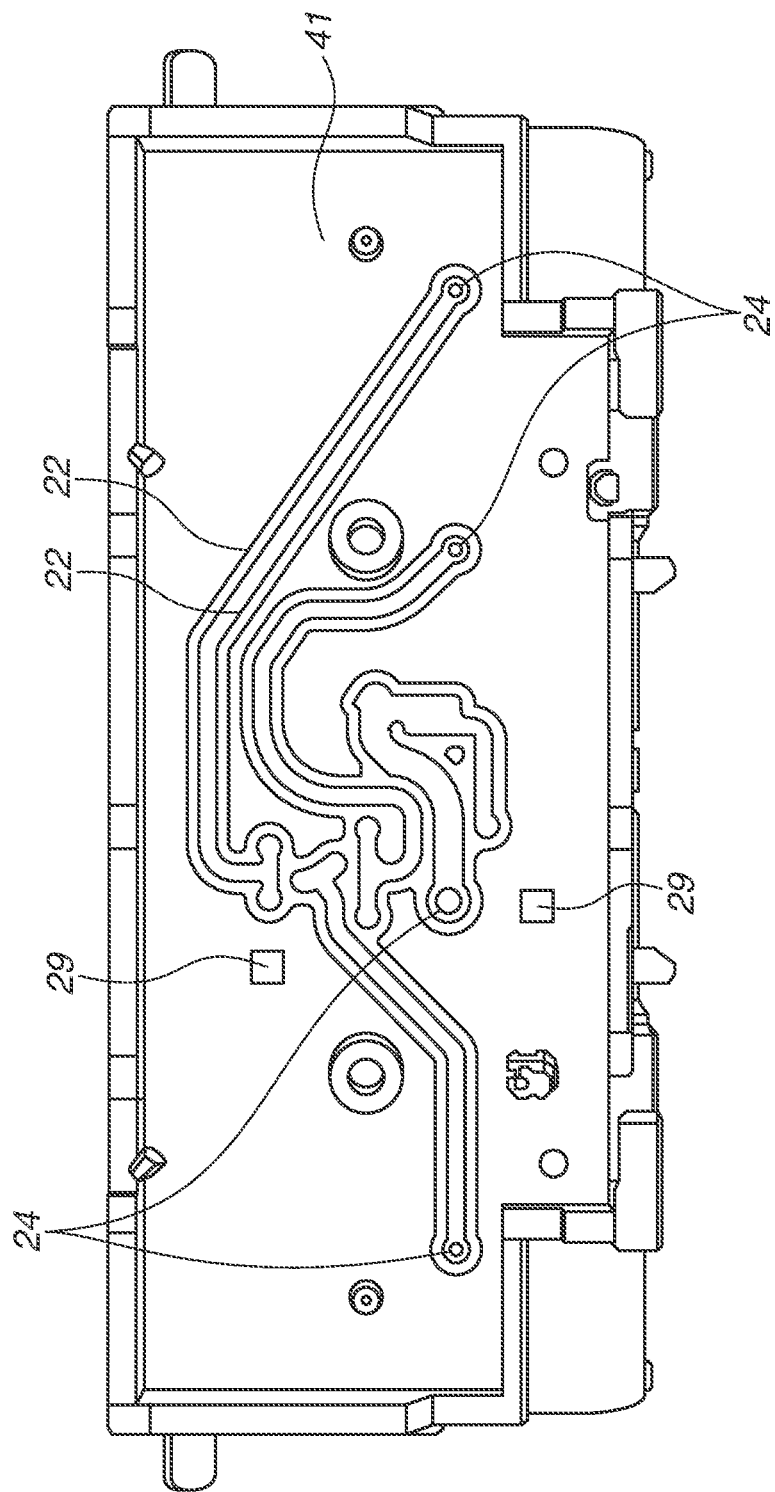
FIG. 14 is a top view illustrating a housing according to the second exemplary embodiment.
Figure 15:
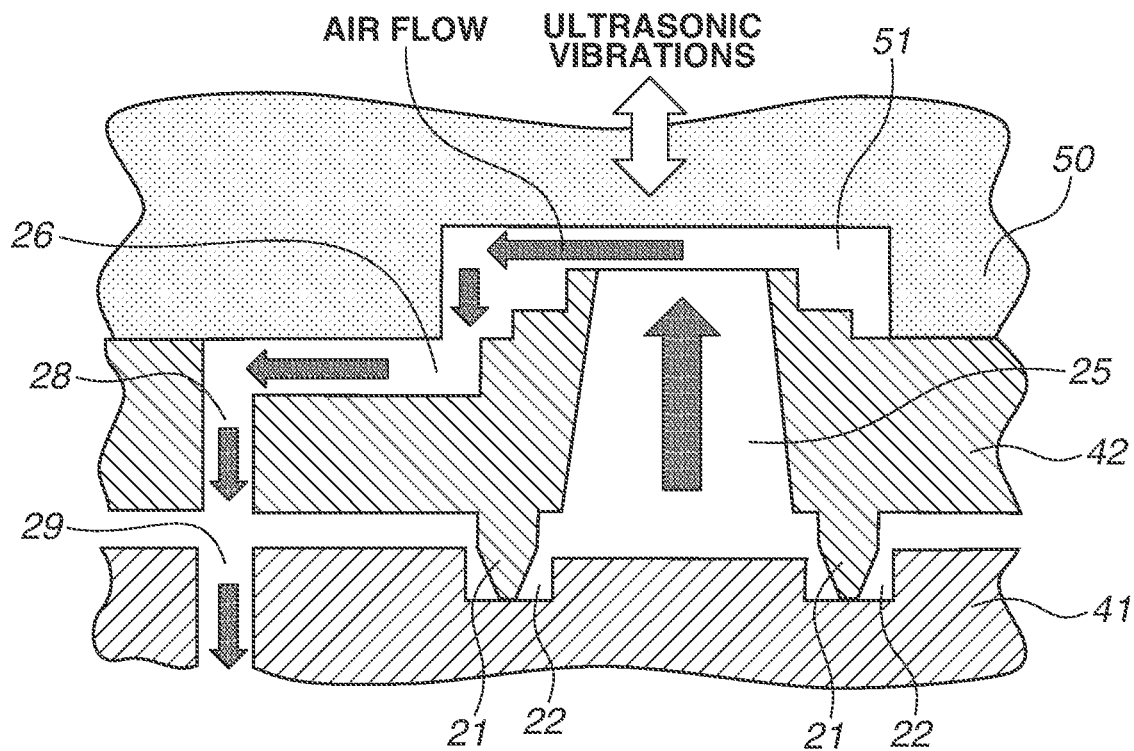
FIG. 15 is a schematic view illustrating a flow of air during ultrasonic welding according to the second exemplary embodiment.

A second exemplary embodiment will be described with reference to FIGS. 13 to 15. Portions similar to those in the first exemplary embodiment will be denoted by the same reference numbers or signs, and descriptions thereof will be omitted. The present exemplary embodiment is characterized in that chips removed by air flow are enabled to be easily collected. FIG. 13 is a top view illustrating a channel-forming member 42 according to the present exemplary embodiment. FIG. 14 is a top view illustrating a housing 41 according to the present exemplary embodiment. FIG. 15 is a schematic view illustrating a flow of air during ultrasonic welding according to the present exemplary embodiment, and is a cross-sectional view taken along line C-C illustrated in FIG. 13 in a vibration process.

As illustrated in FIG. 13, in the present exemplary embodiment, groove portions 26 formed on the channel-forming member 42 do not extend as far as an outer edge 17 of the channel-forming member 42. Instead, a third through hole 28 is formed in each of the groove portions 26. The third through holes 28 each penetrate the channel-forming member 42 as illustrated in FIG. 15. On the other hand, fourth through holes 29 are formed in the housing 41 as illustrated in FIG. 14. The fourth through holes 29 each also penetrate the housing 41 as with the third through holes 28. As illustrated in FIG. 15, the third through holes 28 of the channel-forming member 42 and the fourth through holes 29 of the housing 41 are formed such that the position of each of the third through holes 28 and the position of the corresponding one of the fourth through holes 29 overlap when the housing 41 and the channel-forming member 42 are welded together. In other words, the third through holes 28 and the fourth through holes 29 communicate with each other.

In the present exemplary embodiment, after air in the air flow process passes through channels 23, first through holes 25, and the groove portions 26, the air is returned to a housing 41 side through the third through holes 28 and the fourth through holes 29. Thus, chips resulting from ultrasonic welding can be collected on the housing 41 side while the discharging of the chips to the outside is prevented, thus preventing or reducing the scattering of the chips in the welding device.

According to the present exemplary embodiment, in a method of welding members together using frictional heat, chips in the space are removed in a short time.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-197405, filed Nov. 27, 2020, which is hereby incorporated by reference herein in its entirety.

What is claimed is:

1. A method of welding a first member and a second member together, the method comprising:
performing a preparation process of preparing the first member and the second member;
performing a contact process of bringing the first member and the second member into contact so as to form a space between the first member and the second member;
performing a welding-horn contact process of bringing a welding horn into contact with the first member or the second member to form a fluid passage that includes a groove portion;
performing a vibration process of vibrating the welding horn to weld the first member and the second member together by frictional heat; and
performing a fluid-flow process in which the space channels a fluid through the space to flow through the space, through the fluid passage to outside of the contacted first and second members,
wherein the fluid-flow process is performed during the vibration process, and
wherein, in the welding-horn contact process, the welding horn is brought into contact with the first member,
wherein the first member has a first through hole penetrating the first member,
wherein the second member has a second through hole penetrating the second member,
wherein the space communicates with the first through hole and the second through hole, and
wherein the fluid used in the fluid-flow process is made to flow into the space from the second through hole.

2. The method according to claim 1, wherein the fluid-flow process is started before a start of the vibration process.

3. The method according to claim 1, wherein the welding horn has a recess portion in a portion corresponding to a position of the first through hole.

4. The method according to claim 1, wherein the first member has, on a side of the first member with which the welding horn is to be brought into contact, the groove portion that extends from a vicinity of the first through hole to an outer edge of the first member.

5. A method of manufacturing a liquid discharge head to discharge liquid from a discharge nozzle, the method comprising:

performing preparation process of preparing a channel-forming member that has a recess portion, and a fitting member that has a fitting portion that, when the recess portion of the channel-forming member is fit with the fitting portion, a channel is formed by the channel-forming member and the fitting portion and is configured to supply liquid to the discharge nozzle;

performing a contact process of bringing the channel-forming member and the fitting member into contact so as to fit the recess portion and the fitting portion into each other to form the channel;

performing a welding-horn contact process of bringing a welding horn into contact with the channel-forming member or the fitting member;

performing vibration process of vibrating the welding horn to weld the channel-forming member and the fitting member together by frictional heat; and performing a fluid-flow process of making a fluid flow through the channel, wherein the fluid-flow process is performed during the vibration process.

6. The method according to claim 5, wherein the fluid-flow process is started before a start of the vibration process.

7. The method according to claim 5, wherein, in the welding-horn contact process, the welding horn is brought into contact with the channel-forming member, wherein the channel-forming member has a first through hole penetrating the channel-forming member, wherein the fitting member has a second through hole penetrating the fitting member, wherein the channel communicates with the first through hole and the second through hole, and wherein the fluid used in the fluid-flow process is made to flow into the channel from the second through hole.

8. The method according to claim 7, wherein the welding horn has a recess portion in a portion corresponding to a position of the first through hole.

9. The method according to claim 7, wherein the channel-forming member has, on a side of the channel-forming member with which the welding horn is to be brought into contact, a groove portion in a vicinity of the first through hole.

10. The method according to claim 9, wherein the groove portion of the channel-forming member extends from the vicinity of the first through hole to an outer edge of the channel-forming member.

11. The method according to claim 9, wherein the channel-forming member has a third through hole penetrating the channel-forming member, in the groove portion of the channel-forming member, wherein the fitting member has a fourth through hole penetrating the fitting member, and wherein the third through hole and the fourth through hole communicate with each other.

12. The method according to claim 9, wherein the groove portion of the channel-forming member is not disposed directly over a welding rib of the channel-forming member.

13. The method according to claim 7, wherein the welding horn has a recess portion in a portion corresponding to a position of the first through hole, and wherein the welding horn has a groove portion that extends from the recess portion of the welding horn to an outer edge of the welding horn.

14. The method according to claim 5, wherein the fluid used in the fluid-flow process is air.

15. The method according to claim 14, wherein the air used in the fluid-flow process is ionized.

16. The method according to claim 5, wherein the fluid-flow process is performed by sucking an inside of the channel.

17. The method according to claim 5, wherein the vibration process is ultrasonic vibrating.

18. The method according to claim 5, wherein the fitting member is a housing to which a liquid container that contains the liquid is to be connected.

19. The method according to claim 1, wherein the vibration process results in welds that secure the first member and the second member together and the space is between the welds.

20. The method according to claim 1, wherein performing the fluid-flow process during the vibration process removes chips from inside the space before static electricity causes the chips to stick to inner wall surfaces of the space.

21. The method according to claim 20, wherein the fluid-flow process is such that the fluid is air that is ionized to ensure that the chips are discharged from the space before occurrence of a welding fin at a joint part and the air is temperature controlled to reduce an amount of chips to be generated by shortening the vibration process.

22. The method according to claim 1, wherein bringing the first member and the second member into contact form a plurality of spaces, each having different degrees of fluid pressure losses, and performing the fluid-flow process includes independently controlling the pressure of the fluid for each of the plurality of spaces to ensure a similar fluid flow rate for each of the plurality of spaces.

23. A method of manufacturing a liquid discharge head having a housing unit that includes a housing and a channel-forming member, the method comprising:

presenting the housing and the channel-forming member, wherein the housing includes a fitting portion, first recess portions, second ink through holes, and a housing welding plane, and the channel-forming member includes a second recess portion, welding ribs, a member welding plane, and a member surface on a side opposite to the member welding plane;

bringing the member welding plane of the channel-forming member into contact with the housing welding plane of the housing so that the second recess portion is aligned with the fitting portion to form ink channels, and the welding ribs are fitted into the first recess portions, wherein, after the liquid discharge head is manufactured, the ink channels are configured to supply ink from ink containers configured to pass ink into the second ink through holes of the housing and through the ink channels to discharge nozzles of the liquid discharge head;

bringing a welding horn surface of a welding horn into contact with the member surface of the channel-forming member;

sending air into the second ink through holes so that the air flows through the ink channels before vibrating the welding horn;

vibrating, while the air flows through the ink channels, the welding horn to generate friction heat that welds the welding ribs of the channel-forming member and the first recess portions of the housing together, wherein flow rate of air through the ink channels while vibrating the welding horn is configured so as to carry welding rib chips, pealed off from the welding ribs during the vibrating, through the ink channels to outside of the liquid discharge head before static electricity sticks the welding rib chips to inner wall surfaces of the ink channels.

24. The method according to claim 23, wherein the channel-forming member further includes first ink through holes and groove portions, and the welding horn includes third recess portions in the welding horn surface that overlap part of the groove portions of the channel-forming member when the welding horn and the channel-forming member are in contact with each other, the method further comprising:

completing discharging of the welding rib chips carried by the air to the outside of the liquid discharge head before the completion of the welding by passing the air carrying the welding rib chips (i) through the first ink through holes, (ii) through the third recess portions in the welding horn surface, and then (iii) through the groove portions overlapped by the third recess portions in this order.

* * * * *